US011085150B2

(12) United States Patent
Tirimacco et al.

(10) Patent No.: US 11,085,150 B2
(45) Date of Patent: Aug. 10, 2021

(54) TISSUE ROLLS HAVING VARIABLE CROSS-MACHINE DIRECTION PROPERTIES

(71) Applicant: Kimberly-Clark Worldwide, Inc., Neenah, WI (US)

(72) Inventors: Maurizio Tirimacco, Appleton, WI (US); Christopher Steven LeCount, Greenville, WI (US); Daniel John Schultz, Appleton, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 16/623,864

(22) PCT Filed: Jun. 28, 2017

(86) PCT No.: PCT/US2017/039729
§ 371 (c)(1),
(2) Date: Dec. 18, 2019

(87) PCT Pub. No.: WO2019/005036
PCT Pub. Date: Jan. 3, 2019

(65) Prior Publication Data
US 2020/0131706 A1    Apr. 30, 2020

(51) Int. Cl.
*D21G 1/02*        (2006.01)
*D21H 27/00*       (2006.01)
*D21H 27/02*       (2006.01)

(52) U.S. Cl.
CPC ............ *D21G 1/02* (2013.01); *D21H 27/005* (2013.01); *D21H 27/02* (2013.01)

(58) Field of Classification Search
CPC ............................................... B31F 2201/0738
See application file for complete search history.

(56) References Cited

U.S. PATENT DOCUMENTS

| 3,859,027 A | 1/1975 | Messner |
| 4,507,173 A | 3/1985 | Klowak et al. |
| 4,671,983 A | 6/1987 | Burt |

(Continued)

FOREIGN PATENT DOCUMENTS

| EP | 2018959 A2 | 1/2009 |
| JP | 2008295832 A | 12/2008 |

(Continued)

*Primary Examiner* — William P Watkins, III
(74) *Attorney, Agent, or Firm* — Kimberly-Clark Worldwide, Inc.

(57) ABSTRACT

The invention provides calendered tissue webs and products produced by passing a tissue web through a calender nip created by a patterned roll having a first pattern and a second pattern thereon and a substantially smooth roll. As the web is transported through the nip it is subjected to variable calender loads that impart variable cross-machine (CD) direction properties to the resulting calendered web. CD properties that may be varied according to the present invention include sheet caliper, sheet bulk and surface smoothness. The variable CD property may be preserved in the web as it is further converted, such as winding about a core, resulting in tissue products having physical properties that vary along at least one dimension of the product.

31 Claims, 7 Drawing Sheets

(56) References Cited

U.S. PATENT DOCUMENTS

| | | | |
|---|---|---|---|
| 5,356,364 | A | 10/1994 | Veith et al. |
| 5,518,199 | A | 5/1996 | Welp et al. |
| 5,693,403 | A | 12/1997 | Brown et al. |
| 5,817,205 | A | 10/1998 | Kaule |
| 6,077,390 | A | 6/2000 | Salman et al. |
| 6,746,569 | B1 | 6/2004 | Wolkowicz et al. |
| 7,235,156 | B2 | 6/2007 | Baggot |
| 7,497,926 | B2 | 3/2009 | Hermans et al. |
| 7,611,605 | B2 | 11/2009 | Burazin et al. |
| 7,815,764 | B2 | 10/2010 | Perini |
| 8,475,908 | B2 | 7/2013 | Sauter et al. |
| 8,940,376 | B2 | 1/2015 | Stage et al. |
| 2005/0034828 | A1 | 2/2005 | Graff et al. |
| 2005/0161179 | A1 | 7/2005 | Hermans et al. |
| 2008/0216975 | A1* | 9/2008 | Farwig ............. B31F 1/07 162/109 |
| 2011/0189436 | A1 | 8/2011 | Manifold et al. |
| 2011/0311345 | A1 | 12/2011 | McNeil |
| 2014/0346704 | A1 | 11/2014 | Sartini et al. |
| 2015/0001783 | A1 | 1/2015 | Gann-Fetter et al. |
| 2015/0173956 | A1 | 6/2015 | Coe et al. |

FOREIGN PATENT DOCUMENTS

| | | | |
|---|---|---|---|
| JP | 2010131232 | A | 6/2010 |
| WO | 14074042 | A1 | 5/2014 |
| WO | 16159966 | A1 | 10/2016 |

* cited by examiner

TISSUE ROLLS HAVING VARIABLE CROSS-MACHINE DIRECTION PROPERTIES

BACKGROUND OF THE DISCLOSURE

For rolled tissue products, such as bathroom tissue and paper towels, consumers generally prefer firm rolls having a large diameter. A firm roll conveys superior product quality and a large diameter conveys sufficient material to provide value for the consumer. From the standpoint of the tissue manufacturer, however, providing a firm roll having a large diameter is a challenge. In order to provide a large diameter roll, while maintaining an acceptable cost of manufacture, the tissue manufacturer must produce a finished tissue roll having higher roll bulk. One means of increasing roll bulk is to wind the tissue roll loosely. Loosely wound rolls however, have low firmness and are easily deformed, which makes them difficult to process, such as by cutting, and packaging, and may be unappealing to consumers. As such, there is a need for tissue rolls having high bulk as well as good firmness.

Although it is desirable to provide a sheet having high bulk and good roll firmness, improvement of one of these properties typically comes at the expense of another. For example, as the basis weight of the tissue sheets is increased, achieving high roll bulk becomes more challenging since much of the bulk of the tissue structure is achieved by molding of the embryonic tissue web into the paper-making fabric and this bulk is decreased by increasing the basis weight of the sheet. Hence the tissue manufacturer must strive to economically produce a tissue roll that meets these often-contradictory parameters of large diameter, good firmness, high quality sheets and acceptable cost.

SUMMARY OF THE DISCLOSURE

The present inventors have now discovered an alternative to conventional calendering which results in tissue webs having variable physical properties in the cross-machine direction. The variability in the cross-machine direction web properties results in rolled products, such as parent rolls and rolled tissue products, having properties that vary in the cross-machine direction as well. For example, in one embodiment the present invention provides a parent roll having a circumferential and axial direction comprising a calendered tissue web spirally wound around a core, the parent roll having a first region and a second region spaced apart in the axial direction wherein the at least one physical parameter, such as firmness, varies between the first and second regions. Generally the variability of at least one physical property is at least 5 percent and still more preferably at least about 10 percent. For example, the first region may have a sheet caliper of about 1,000 µm or greater and the second region may have a caliper of about 900 µm or less.

By varying the at least one physical property across the axial direction of the parent roll, the processing of the parent roll, such as by cutting into individual rolled tissue products, may be improved without compromising the quality or aesthetics of the resulting rolled tissue product.

Accordingly, in one embodiment the present invention provides a calendered tissue web having a machine direction and a cross-machine direction spirally wound around a core, the tissue web having a first cross-machine direction region and a second cross-machine direction region wherein the first region has at least one physical web property selected from the group consisting of sheet caliper, sheet bulk and surface smoothness that is different from the second region.

In still another embodiment the present invention provides a rolled tissue product comprising a calendered tissue web having a machine direction, a cross-machine direction and first, second and third cross-machine direction regions, the web spirally wound into a roll having a first end, a second end and a middle portion disposed there-between, wherein the first and third cross-machine direction regions are adjacent to the first and second ends and wherein the firmness of the first and the second ends is greater than the firmness of the middle portion. Firmness is reported herein as Kershaw Firmness, which is measured using the Kershaw Test as described below, where a lower value corresponds to higher firmness. The lengths of the first, second and third cross-machine direction region relative to length of the roll may vary however, in certain embodiments the first and third regions are substantially the same length and at least about 5 percent of the length of the roll, such as from about 5 to about 20 percent and more preferably from about 5 to about 10 percent. The second region may have a length that is about 50 percent of the length of the roll, such as from about 50 to about 90 percent and more preferably from about 70 to about 90 percent.

In another embodiment the present invention provides a patterned cylindrical calender roll having a circumferential direction and an axial direction, the roll comprising a first pattern and a second pattern, the first and second patterns spaced apart in the axial direction and extending continuously about the roll in the circumferential direction, the first pattern comprising a plurality of male elements having a first elevation separated from one another by landing areas having a second elevation wherein the difference between the first and second elevations provides the first pattern with a first pattern height, second pattern comprising a plurality of male elements having a first elevation separated from one another by landing areas having a second elevation wherein the difference between the first and second elevations provides the second pattern with a second pattern height, wherein the first pattern height is greater than the second pattern height.

In yet another embodiment the present invention provides a patterned cylindrical calender roll having a circumferential direction and an axial direction, the roll comprising a first pattern and a second pattern, the first and second patterns spaced apart in the axial direction and extending continuously about the roll in the circumferential direction, the first pattern having a first pattern height from about 0.50 to about 2.0 mm and comprising from about 10 to about 20 percent of the total surface of the pattern roll, and the second pattern having a second pattern height from about 0.20 to about 0.75 mm and comprising from about 80 to about 90 percent of the total surface of the pattern roll, and wherein the first pattern height is greater than the second pattern height.

In still another embodiment the present invention provides a calendering process comprising the steps of: providing a tissue web comprising pulp fibers; providing a rotating pattern roll having a circumferential direction and an axial direction in facing opposition to a moving surface creating a nip there-between, the pattern roll comprising a first pattern and a second pattern, the first and second patterns spaced apart in the axial direction and extending continuously about the roll in the circumferential direction, the first pattern comprising a plurality of male elements having a first elevation separated from one another by landing areas having a second elevation wherein the difference between the first and second elevations provides the first pattern with a first pattern height, a second pattern comprising a plurality of male elements having a first elevation separated from one another by landing areas having a second elevation wherein the difference between the first and second elevations provides the second pattern with a second pattern height, wherein the first pattern height is greater than the second pattern height; conveying the tissue web through the nip; and contacting the web against the outer surface of the rotating pattern roll and the opposing moving surface.

DEFINITIONS

As used herein, the term "basis weight" generally refers to the bone dry weight per unit area of a tissue and is generally expressed as grams per square meter (gsm). Basis weight is measured using TAPPI test method T-220.

As used herein, the term "caliper" is the representative thickness of a single sheet measured in accordance with TAPPI test method T402 using an EMVECO 200-A Microgage automated micrometer (EMVECO, Inc., Newberg, Oreg.). Where a tissue sheet comprises two or more plies, caliper is the thickness of a single sheet of tissue product comprising all plies. The micrometer has an anvil diameter of 2.22 inches (56.4 mm) and an anvil pressure of 132 grams per square inch (per 6.45 square centimeters) (2.0 kPa). A total of ten sheets of tissue product are measured and the total is divided by ten to arrive at the single sheet caliper.

As used herein, "cross-machine direction" or "CD" means the direction perpendicular to the machine direction in the same plane of the tissue web or tissue product.

As used herein, "machine direction" or "MD" means the direction parallel to the flow of the tissue web through the papermaking machine or product manufacturing equipment.

As used herein, the term "firmness" generally refers to Kershaw Firmness, which is measured using the Kershaw Test as described in detail in U.S. Pat. No. 6,077,590, which is incorporated herein by reference in a manner consistent with the present disclosure. The apparatus is available from Kershaw Instrumentation, Inc. (Swedesboro, N.J.) and is known as a Model RDT-2002 Roll Density Tester. Firmness generally has units of mm or cm. A lower firmness value generally indicates a rolled product having greater firmness, while a higher firmness value indicates a rolled product that is less firm.

As used herein, the term "parent roll" refers to a long roll of tissue that has not been cut into smaller rolls that are suitable for sale to consumers. Parent rolls, also referred to in the art as logs or paper logs, may be from about 80 inches to about 120 inches in length and from about 3 inches to about 8 inches in diameter. In one embodiment a parent roll may be disposed around an inner core that may be made of any suitable material for supporting the parent roll.

As used herein, the term "pattern" generally refers to any shapes, forms, graphics, symbols, and combinations thereof. Examples of pattern can be purely abstract geometric shapes, such as circles or waves, and/or be evocative of natural elements such as floral patterns, and/or be evocative of certain texture or fabrics such as laces. The patterns of the invention can normally be visually recognizable.

As used herein, "ply" or "plies", means an individual fibrous structure or sheet of fibrous structure, optionally to be disposed in a substantially contiguous, face-to-face relationship with other plies, forming a multi-ply fibrous structure. It is also contemplated that a single fibrous structure can effectively form two "plies" or multiple "plies", for example, by being folded on itself.

As used herein, the term "roll bulk" refers to the volume of paper divided by its mass on the wound roll. Roll bulk is calculated by multiplying pi (3.142) by the quantity obtained by calculating the difference of the roll diameter squared ($cm^2$) and the outer core diameter squared ($cm^2$) divided by 4, divided by the quantity sheet length (cm) multiplied by the sheet count multiplied by the bone dry basis weight of the sheet in grams per square meter (gsm).

As used here, the term "rolled tissue product" refers to any tissue product that is wound about an axis. In an embodiment, a rolled tissue product is provided by winding a tissue product, such as a tissue product comprising a first and a second tissue ply, around a cardboard core.

As used herein, the term "sheet bulk" refers to the quotient of the caliper ($\mu m$) divided by the bone dry basis weight (gsm). The resulting sheet bulk is expressed in cubic centimeters per gram (cc/g).

As used herein, the term "stiffness index" refers to the quotient of the GM slope (having units of g/3") divided by the geometric mean tensile strength (having units of g/3"). GM slope generally refers to the square root of the product of machine direction slope and cross-machine direction slope, which refers to slope of the line resulting from plotting tensile versus stretch and is an output of the MTS TestWorks™ in the course of determining the tensile strength as described in the Test Methods section herein. Slope is generally reported in the units of mass (generally kg or g) per unit of sample width (generally three inches) and is measured as the gradient of the least-squares line fitted to the load-corrected strain points falling between a specimen-generated force of 70 to 157 grams (0.687 to 1.540 N) divided by the specimen width.

As used herein, the term "surface smoothness" refers to the average smoothness of the top and bottom surfaces of the tissue product and is calculated by averaging the square root of the product of MIU-CD and MIU-MD for the top and bottom surfaces. MIU-CD and MIU-MD refer to the surface friction in the cross-machine direction (CD) and machine direction (MD) for either the top or bottom surface of the tissue product measured using a KES Surface Tester (Model KE-SE, Kato Tech Co., Ltd., Kyoto, Japan) as described in the Test Methods section below and is generally unit-less and a lower surface smoothness value indicates a smoother, less rough surface.

As used herein, the term "tissue product" refers to products made from tissue webs and includes, bath tissues, facial tissues, paper towels, industrial wipers, foodservice wipers, napkins, medical pads, and other similar products. Tissue products may comprise, one, two, three or more plies where individual plies may be made with the same or different manufacturing process and may comprise the same or different physical properties.

As used herein, the terms "tissue web" and "tissue sheet" refer to a fibrous sheet material suitable for forming a tissue product.

As used herein, the term "visually perceivable" when referring to a region of a tissue web, rolled tissue product or parent roll, such as a first or a second cross-machine direction region, generally refers to features that are readily discernible to the normal naked eye. Generally the calendering method of the present invention does not impart a visually perceivable pattern to the tissue web or the resulting tissue product or parent roll. Thus, while calender rolls useful in the present invention may have a visually perceivable pattern, such as a first and second pattern formed from first and second elements, the resulting calendered webs are not imparted with a visually perceivable pattern thereby.

DETAILED DESCRIPTION OF THE DISCLOSURE

The novel tissue parent rolls and rolled tissue products of the present invention are generally produced by calendering tissue basesheets, also referred to herein as tissue webs, using at least one patterned roll comprising a first and a second pattern. Generally the first and second patterns are spaced along the axial direction of the patterned roll and in a particularly preferred embodiment do not overlap one another, but rather, lie adjacent to one another. The first and second patterns are generally visually perceivable on the pattern roll and may be visually distinguishable from one another. In a particularly preferred embodiment the first and second patterns are formed from first and second elements having different element heights.

The patterned calender roll is generally paired with a substantially smooth calender roll to form a calender unit to process tissue webs according to the present invention. Pairing a patterned calender roll with a substantially smooth calender roll provides a calender unit having a nip with variable loading in the axial direction. When a tissue web is transported through the nip in the machine direction the variable loading imparts the web with variable cross-machine (CD) direction properties such as, for example, sheet bulk, sheet caliper or surface smoothness. While calendering generally imparts the calendered web with at least one CD variable physical property the process generally does not impart the web with a visually perceivable pattern or image. For example, while a calendered web prepared as described herein may have a first region having a sheet caliper of about 1,000 μm and a second region having a sheet caliper of about 800 μm, the first and second regions do not have a visually perceivable difference. Rather, the web appears visually similar across the cross-machine direction.

When the calendered webs are converted into rolled tissue products the rolled products may also have physical properties, such as roll bulk and firmness that varies across a given dimension of the roll. For example, in certain embodiments the presently disclosed calendering unit may be used to produce novel tissue parent rolls having cross-machine direction physical properties, such as firmness, sheet bulk, sheet caliper and surface smoothness. For example, parent rolls may be manufactured such that they have regions of relatively low firmness, such as a firmness from greater than 8.0 mm, bound by regions of relatively high firmness, such as a firmness less than 8.0 mm. In certain embodiments the parent roll may be manufactured such that the regions of relatively high firmness bordering the areas of relatively low firmness may be registered with cutting implements such that the cutting implements cut the log within the high firmness regions.

When the foregoing parent rolls are cut into individual rolled tissue products, the rolled products too may have properties that vary along one of their dimensions. For example, the rolled tissue product may comprise a spirally wound calendered web, the rolled product having a first end, a second end and a middle disposed there-between where the first and second ends of the rolled product have a firmness that is greater than the firmness of the middle portion. For example the first and second ends may have a firmness that is about 10 percent greater and more preferably about 20 percent greater and still more preferably about 40 percent greater than the firmness of the middle portion of the roll. Thus, in certain embodiments, the first and second ends may have a firmness from about 4.0 to about 6.0 mm and the middle portion may have a firmness from about 8.0 to about 10.0 mm.

Figure 1:
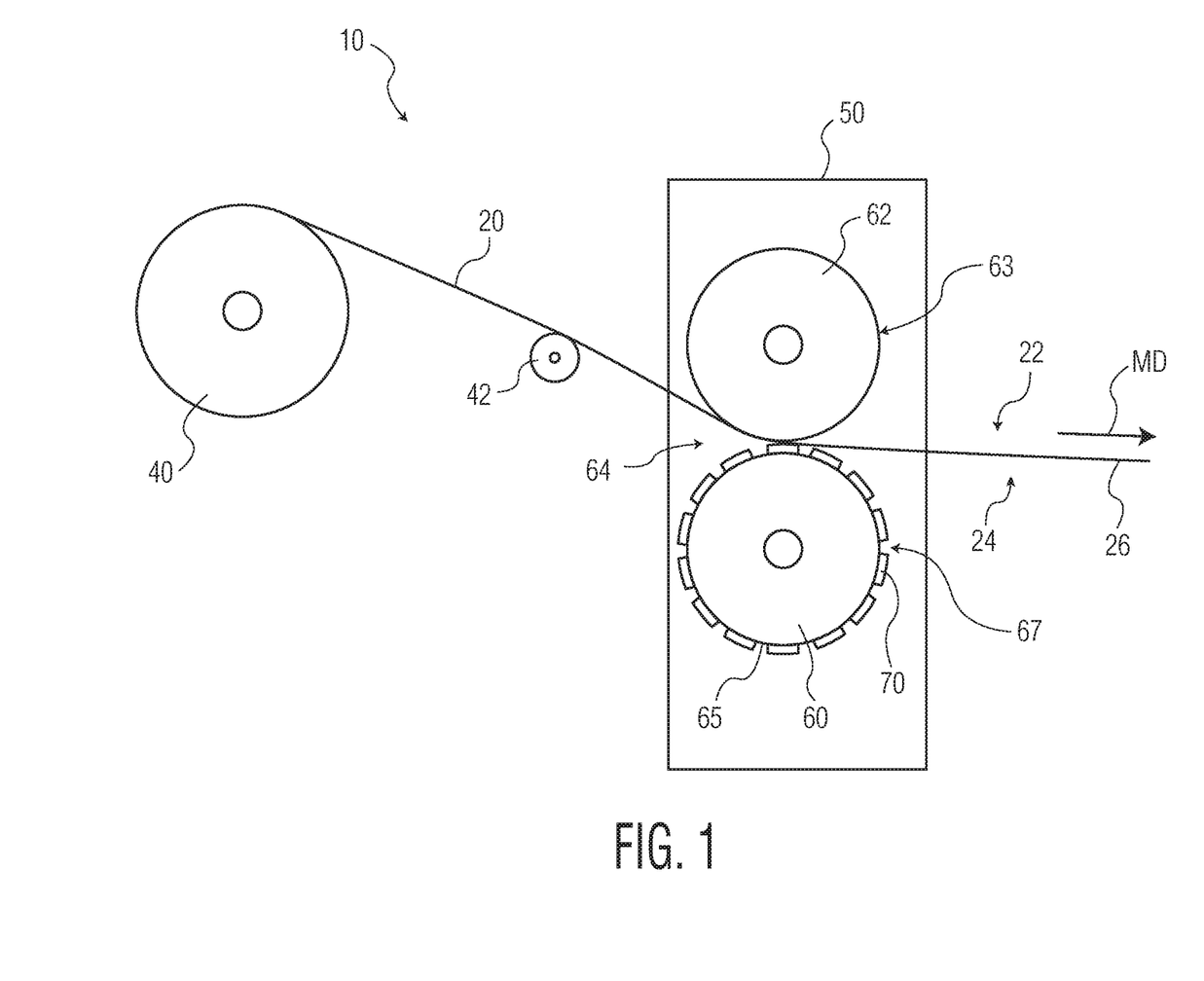
FIG. 1 illustrates a calendering process according to one embodiment of the present invention.

Referring to FIG. 1, an off-line converting operation 10 for converting a tissue web 20 is illustrated. Those skilled in the art will appreciate that, although the converting operation 10 is illustrated as being off-line, a similar unit operation may be applied in-line. The tissue web 20 is unwound from a roll 40 and transported in sequence to a calendering unit 50.

The calendering unit 50 includes a pair of calendering rolls 60 and 62 that together define a calendering nip 64 there-between. A spreader roll 42 is shown preceding the calendering nip 64, although other details of the calendering unit 50 are not shown for purposes of clarity. In a particularly preferred embodiment the calender unit 50 comprises a patterned roll 60 having elements 70 elevated above the landing areas 65 and defining a first and a second pattern. The patterned roll 60 is mounted in opposition to a substantially smooth roll 62 creating a nip 64 there-between. The web 20, having upper 22 and bottom 24 surfaces, passes through the nip 64 and emerges as a calendered web 26. As illustrated, the bottom surface 24 contacts the patterned roll 60, however, one skilled in the art will appreciate other configurations are possible. In addition to the calendering rolls having different surface patterns, the calendering nip may be a "soft-nip" wherein the calendering rolls have different surface hardness.

The substantially smooth calender roll 62 may be a soft covered calender roll. For example, in certain embodiments, the peripheral surface 63 of the substantially smooth calender roll 62 may comprise natural rubber, synthetic rubber, composites, or other compressible surfaces. A preferred material for the peripheral surface 63 of the substantially smooth calender roll 62 is ethylene propylene diene polymer. This material is compressible and holds up well under pressure. Suitable substantially smooth calender rolls should have a Shore A surface hardness of from between about 65 to about 100 Durometer (approximately 75 to about 0 Pusey & Jones, respectively), preferably, from between about 75 to about 100 Durometer (approximately 55 to about 0 Pusey & Jones, respectively), and most preferably, from between about 85 to about 95 Durometer (approximately 35 to about 10 Pusey & Jones respectively). The use of a substantially smooth calender roll having an ethylene propylene diene polymer outer surface with a Shore A surface hardness of about 90 Durometer (approximately 25-30 Pusey & Jones) is particularly suited to the present process.

Opposite the substantially smooth calender roll 62 is a patterned roll 60 which comprises a plurality of male elements 70 disposed in a first and a second pattern (not illustrated in FIG. 1). The male elements 70 along with the landing areas 65 that surround them form the peripheral surface 67 of the patterned roll 60. As will be discussed in more detail below, the relative coverage area of the male elements, relative to the total surface area of the roll may be varied from about 50 to about 95 percent and more preferably from about 70 to about 90 percent, and still more preferably from about 75 to about 90 percent to achieve the desired finished tissue web properties.

Further, the male elements may be discrete or may be continuous or semi-continuous. As used herein, the pattern of elements is considered "discrete" if any one element does not extend substantially throughout a principal direction of the roll surface. Further, as used herein, male elements are considered to be "semi-continuous" if a plurality of the elements extend substantially throughout one dimension of the roll surface, and each element in the plurality is spaced apart from an adjacent element. The elements in the semi-continuous pattern may be generally parallel to one another, may form a wave pattern, or form a pattern in which adjacent elements are offset from one another with respect to the phase of the pattern. The semi-continuous element may be aligned in any direction within the plane of the patterned roll surface. Thus, the element may span the entire cross-machine direction of the roll surface, may endlessly encircle the roll surface in the machine direction, or may run diagonally relative to the machine and cross-machine directions.

In other embodiments the male elements may form a continuous pattern. A continuous pattern extends substantially throughout both the machine direction and cross-machine direction of the roll surface, although not necessarily in a straight line fashion. Alternatively, a pattern may be continuous because the framework of elements forms at least one essentially unbroken net-like pattern.

The process for manufacturing a tissue web having at least one physical property that varies in the cross-machine (CD) direction begins by passing the web (having a machine and a cross-machine direction) through the nip 64 created by a substantially smooth roll 62 having a peripheral surface 63 which is substantially flat and the patterned roll 60 having a peripheral surface 67 formed with elements 70 that are generally disposed in a first and a second pattern. Preferably the elements extend above the patterned roll surface in the axial direction and are spaced one from another by a given spacing in the circumferential direction. The calendered tissue web may then be wound at a rewinding unit (not illustrated). For example, the calendered tissue web may be wound onto tissue roll cores to form logs, which are subsequently cut to appropriate widths and the resulting individual tissue rolls can then be packaged.

It should be readily appreciated that any operative transport mechanism or system may be employed to move the target web 26 through the method and apparatus 50. Any suitable transport or delivery system or technique may be employed. Conventional systems and mechanisms, such as roller systems, belt systems, pneumatic systems, conveyors, and the like, are well known and available from commercial vendors.

Without being bound by any theory, it is believed that calendering with a pattern roll having a first and second pattern formed from elements that have different element height, element surface area, or total area of element coverage may result in tissue webs having first and second cross-machine direction regions, generally corresponding to the first and second patterns, having at least one physical property such as sheet caliper, sheet bulk or surface smoothness that is different. By varying the elements the Z-directional properties of the web may be varied across the cross-machine direction making the tissue web surface smoother and more planer in certain cross-machine direction regions, while re-orienting and re-bonding the paper fibers at the surface of the paper web. Alteration of the Z-directional properties of the web by the foregoing method however, is generally accomplished without imparting a lasting visual image to the web. Thus, the present invention differs from embossing in that a three dimensional image or design is not imparted on the tissue web as a result of passing the web through the nip created by the opposed calender rolls. Accordingly, in certain embodiments the present invention provides a tissue product that has not been embossed and has a substantially smooth, unpatterned surface, and more preferably an unembossed through-air dried tissue product and still more preferably an unembossed uncreped through-air dried tissue web.

The foregoing method may be used to improve converting of the tissue web and more specifically cutting the tissue parent roll into individual rolled tissue products. Methods for cutting a parent roll are well known in the art. During a typical papermaking process a parent roll is processed and then cut into smaller rolls for retail sale. An exemplary process for cutting parent rolls is shown in U.S. Pat. No. 5,038,647.

When a log comprising a spirally wound conventionally calendered paper web is cut into smaller rolls for retail sale the tissue maker must often wind a uniformly tight and firm roll to optimize cutting. The present invention however, allows the tissue maker to vary the cross-machine direction properties of the web to produce a parent roll with varying firmness, such as alternating regions of high and low firmness. These regions of high and low firmness may be registered with the saw blades commonly used to cut the logs such that the blades cut through regions of high firmness. In this manner the cutting may be optimized without forming a roll that is wound overly tight and with a high degree of firmness across its entire length.

Figures 2A, 2B:
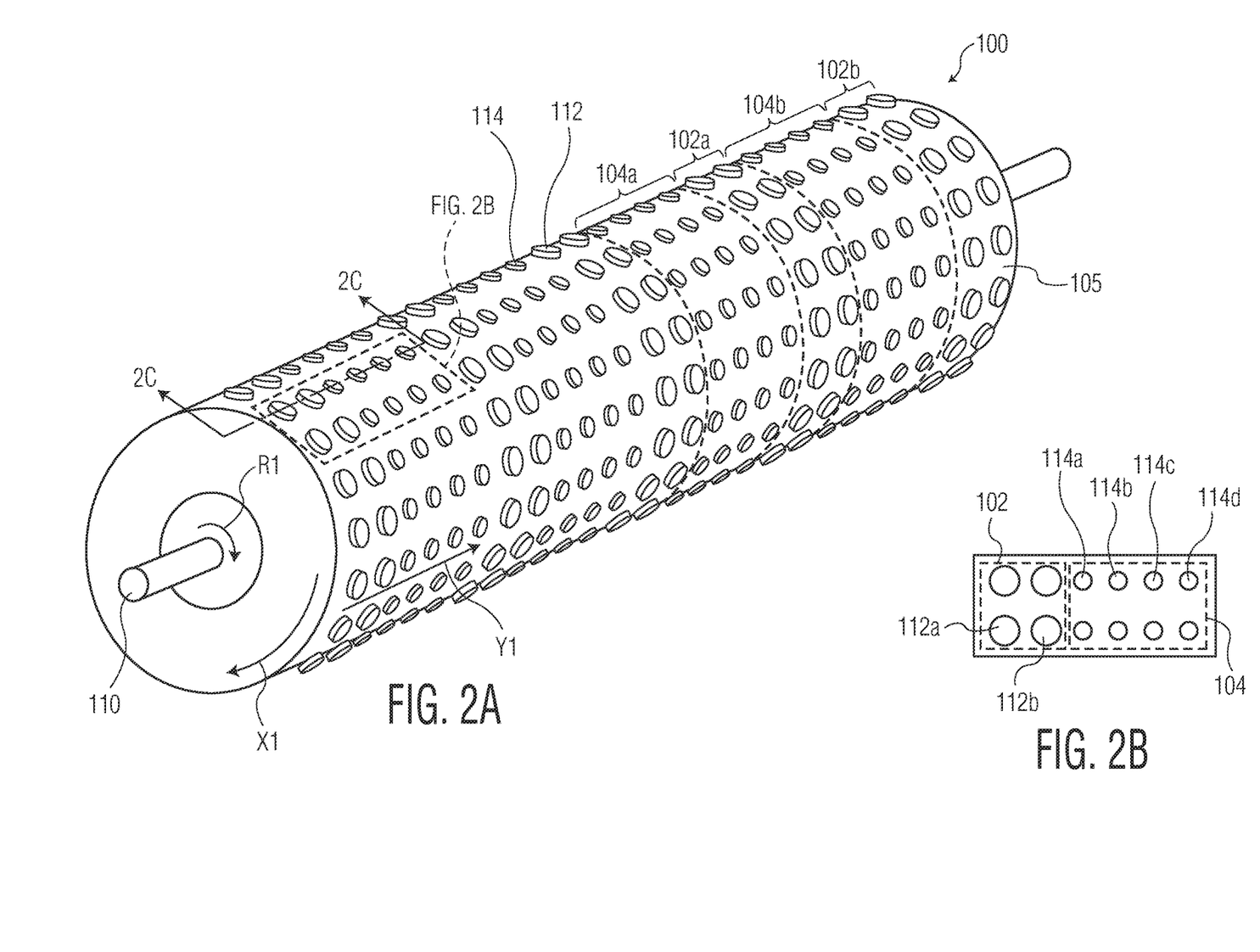
FIG. 2A is a perspective view of a patterned calender roll according to one embodiment of the present invention.
FIG. 2B is a detailed view of a portion of the patterned calender roll of FIG. 2A.

FIG. 2A is a perspective view showing a patterned calender roll 100 used in a process for forming a tissue web with variable cross-machine direction (CD) properties. The roll 100 has a circumferential direction, indicated by an arrow X1, and a lengthwise, axial direction, indicated by the arrow Y1. The roll 100 comprises an axially extending rotational shaft member 110 and an operative axis of rotation indicated by the arrow R1. The roll shafts may be operatively mounted for rotation by employing a suitable support structure in a conventional manner that is well known in the art.

FIG. 2B is a detailed view of the peripheral surface 105 of the patterned calender roll 100 illustrating first and second patterns 102, 104. The first and second patterns 102, 104 are disposed on the peripheral surface 105 and spaced apart from one another in the axial direction Y1. The first and second patterns 102, 104 comprise male elements 112, 114 that are repeated to create the patterns.

Figure 2C:
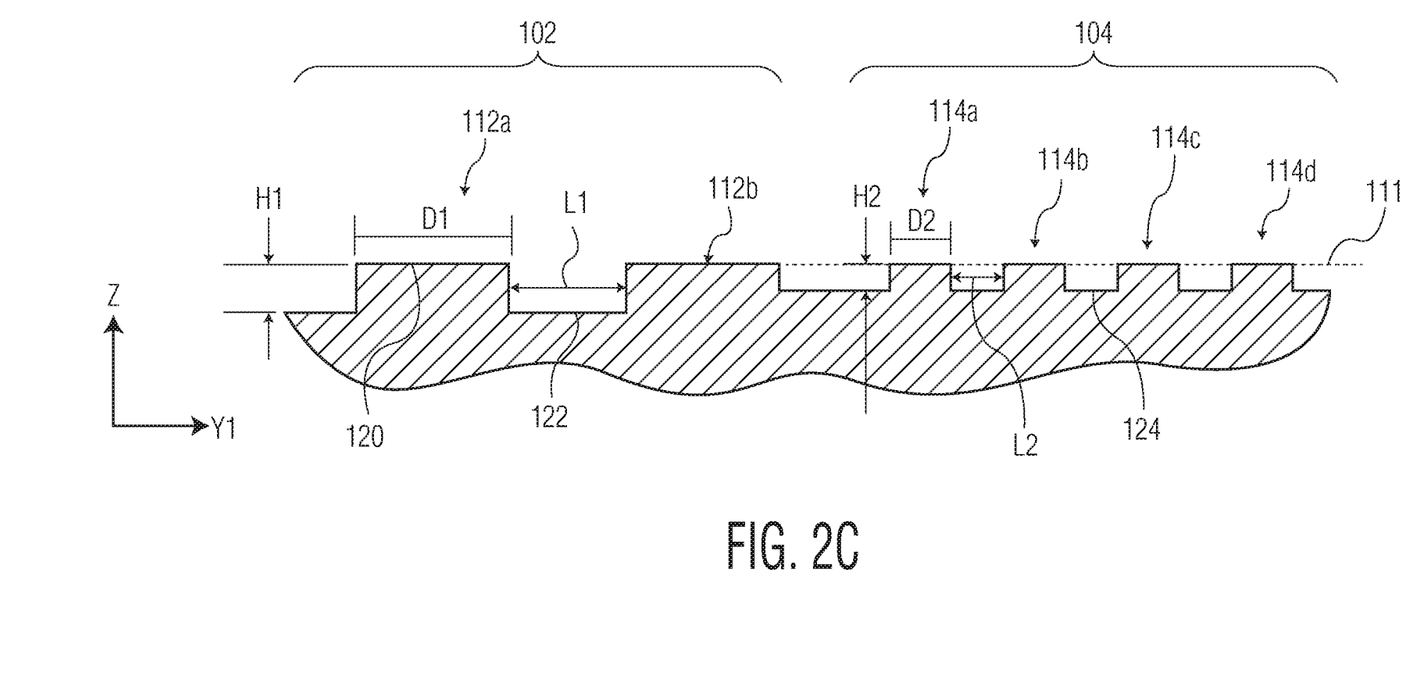
FIG. 2C is a cross-section view through line 2C-2C of FIG. 2A.

FIG. 2C is a fragmentary cross-section of a portion of the peripheral surface 105 through the line 2C-2C of FIG. 2A. FIG. 2C illustrates in detail the male elements 112, 114 forming the first and second patterns 102, 104 including, the relative height (H1, H2), diameter (D1, D2) and lateral spacing (L1, L2) of the elements.

As illustrated in FIG. 2A, the patterned calender roll 100 can have the general form of a cylinder with a substantially circular cross-section. The patterned calender roll 100 generally comprises a first and second patterns 102, 104 disposed generally on and about the peripheral surface 105 of the cylinder. The first and second patterns 102, 104 can be configured to have any operative distribution to achieve the desired variable cross-machine direction (CD) properties in the resulting parent roll or rolled tissue product. Generally each pattern 102, 104 is continuous along the circumferential direction X1 of the roll. In other embodiments the patterns may be arranged in two or more discrete segments along the circumferential-direction of the patterned calender roll. Further, in a preferred embodiment the first and second patterns 102, 104 are spaced apart from one another along the axial direction Y1. For example, the first pattern 102 may be immediately adjacent to the second pattern 104 and the first and second patterns may be repeated across the axial direction of the roll. In other embodiments the first and second patterns may be spaced apart from one another in the axial direction and may be separated from one another by a third pattern.

With continued reference to FIG. 2A, the first and second patterns 102, 104 comprise a plurality of first and second male elements 112, 114, the plurality of first male elements 112 forming the first pattern 102 and the plurality of second male elements 114 forming the second pattern 104. The elements 112, 114, along with the land areas 122 make up the peripheral surface 105 of the roll. In the illustrated embodiment the first and second male elements 112, 114 are discrete and each element is separated from another element by land areas 122. The elements 112, 114 are raised above the first and second areas 122, 124 providing the elements with a height (H1 and H2, illustrated in detail in FIG. 2C).

In the embodiment illustrated in FIG. 2A, the first and second male elements 112, 114 are similarly shaped discrete elements, however, the invention is not so limited and the elements may be different shapes and may be discrete, continuous or semi-continuous. Further, although the first and second elements 112, 114 have a generally circular shape the shape of the elements is not so limited. In certain embodiments the male elements may be circular, elliptical, rectangular, rectangular with rounded edges, square, square with rounded edges, trapezoidal, or trapezoidal with rounded edges. Finally, while FIG. 2A illustrates all of the first elements 102 forming the first pattern 112 as being of similar size and shape and all of the second elements 104 forming the second pattern 114 as being of similar size and shape, the first and second patterns may comprise elements of different size and shapes.

With reference to FIG. 2C, the first pattern 102 comprises a plurality of first male elements 112a, 112b and the second pattern 104 comprises a plurality of second male elements 114a-114d. The elements 112, 114 have upper surfaces 120 that lie in substantially the same plane 111. The first male elements 112 are generally surrounded by first land areas 122 and the second male elements 114 are surrounded by second land areas 124. The first and second land areas 122, 124 generally lie in different planes to provide the first and second elements with different element heights. For example, as shown in FIG. 2C, the distance between the planar upper surface 120 and the first land areas 122 define a first element height (H1) and the distance between the planar upper surface 120 and the second land areas 124 define a second element height (H2).

As further illustrated in FIG. 2C, in a preferred embodiment each of the elements 112, 114 have an upper surface 120 that is substantially planar. In other embodiments, however, the upper surface may have a slight curvature such that the element has a convex cross-sectional shape. In those embodiments where the upper surface of the element is convex the height of the element is measured from the upper most portion of the element surface to the plane of the land area.

In certain embodiments each of the elements forming a given pattern have substantially similar heights and as such the height of a given pattern is substantially equal to the height of the elements forming the pattern. For example, with reference to FIG. 2C, the first elements 112 provide the first pattern 102 with a pattern height that is equal to H1 and the second elements 114 provide the second pattern 104 with a pattern height that is equal to H2.

While it is generally preferred that the height of the elements forming a given pattern be substantially similar, the invention is not so limited, and one skilled in the art will appreciate that the height of elements within a pattern may vary slightly without negatively affecting web properties. As such, in certain embodiments, the height of elements within a given pattern vary less than about ±5 percent and more preferably less than about ±3, such as from about ±0.05 to about 5 percent.

While in certain embodiments the elements forming a given pattern generally have substantially equal heights it is preferred that the first and second patterns have different heights. For example, the first elements forming the first pattern may have a height at least about 50 percent greater, more preferably at least about 100 percent greater and still more preferably at least about 150 percent greater than the height of the second elements forming the second pattern. In certain embodiments the first pattern height may be from about 100 to about 300 percent greater than the height of the second pattern, and more preferably from about 150 to about 250 percent greater. In other embodiments, the first pattern may have a height from 0.50 to about 2.0 mm and more preferably from about 0.75 to about 1.50 mm, where the height of the first pattern is from about 150 to about 250 percent greater than the height of the second pattern. In a particularly preferred embodiment the first elements forming the first pattern have a height from about 0.75 to about 1.50 mm and the second elements forming the second pattern have a height from about 0.10 to about 0.50 mm.

Figures 3A, 3B:
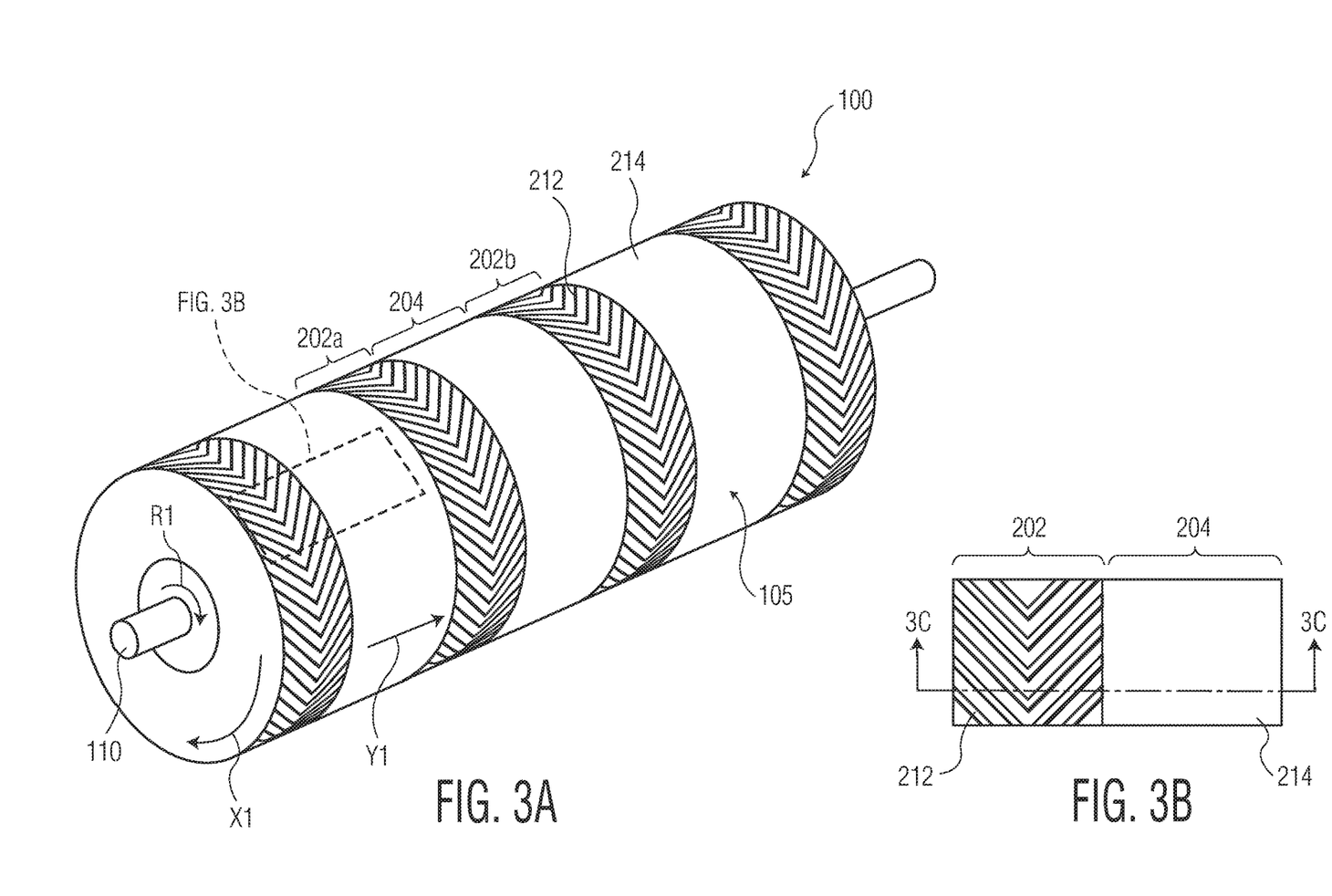
FIG. 3A is a perspective view of a patterned calender roll according to one embodiment of the present invention.
FIG. 3B is a detailed view of a portion of the patterned calender roll of FIG. 3A.
Figure 3C:
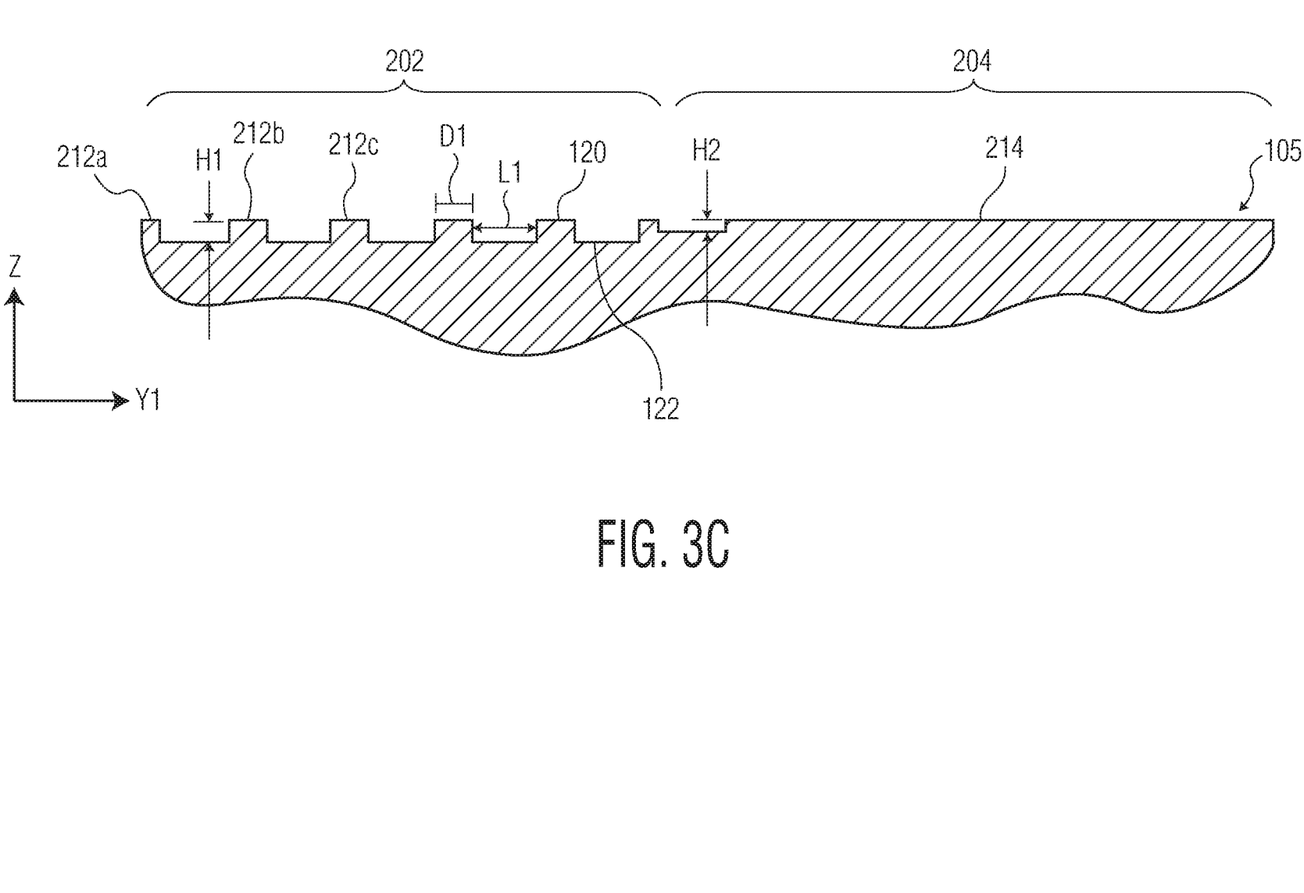
FIG. 3C is a cross-section view through line 3C-3C of FIG. 3B.

As noted previously, while the elements 112, 114 are illustrated in FIG. 2A as having a circular shape, the invention is not so limited and the elements may take a variety of shapes. Further, elements within a given pattern, or between patterns, may have the same shape or different shapes. For example, as illustrated in FIGS. 3A and 3B the first pattern 202 comprises v-shaped semi-continuous elements 212 and the second pattern 204 comprises a single rectangular shaped element 214. The second pattern 204 is bound by the first pattern 202 and the patterns 202, 204 are spaced apart along the axial direction Y1 of the roll 100. Further, as shown in FIG. 3C, the height of the first elements 212 forming the first pattern 202 generally have a height (H1) that is greater than the height (H2) of the second element 214 forming the second pattern 204.

Regardless of the shape of the elements, the elements generally have a length dimension that is measured across the greatest width dimension of the upper surface of the element. The length dimension may vary, but in certain embodiments the pattern may comprise a plurality of discrete elements having a length greater than about 20 mm, such as from about 20 to about 100 mm and more preferably from about 40 to about 80 mm. Further, in certain embodiments the upper surface may have a surface area greater than about 300 mm$^2$, such as from about 300 to about 8,000 mm$^2$ and more preferably from about 1,750 to about 3,000 mm$^2$.

Further, where a pattern comprises a plurality of elements individual elements may be separated from one another by a distance. For example, as shown in FIG. 2C, first elements 112a and 112b are spaced apart a distance (L1), which may be less than about 20 mm, such as from about 0.5 to about 20 mm and more preferably from about 5 to about 10 mm, and the second elements 114a, 114b are spaced apart a distance (L2), which may be equal to, less than or greater than L1.

Figure 4A:
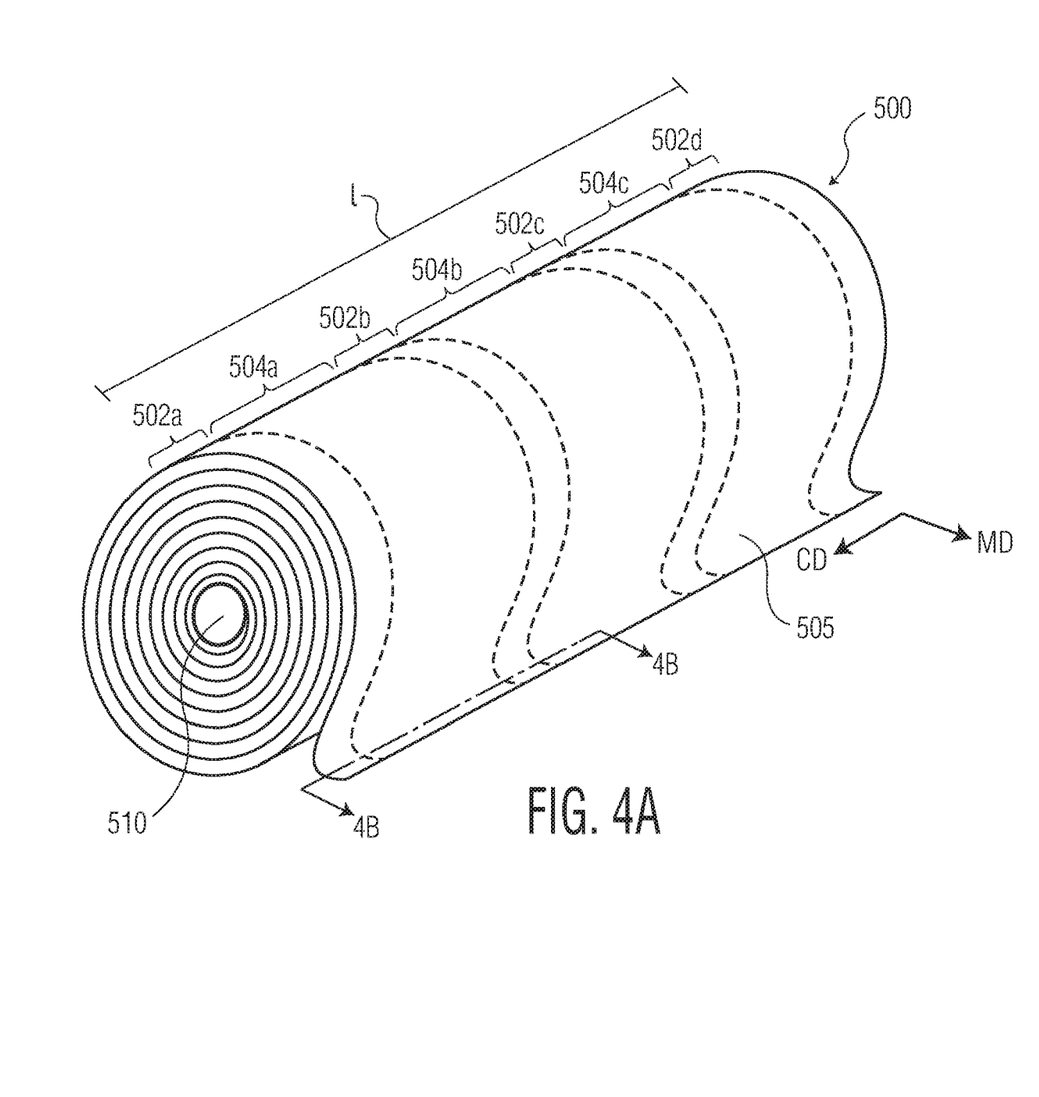
FIG. 4A is a perspective view of a parent roll of tissue produced according to one embodiment of the present invention.

Turning now to FIG. 4A, which illustrates an exemplary embodiment of a parent roll 500 comprising a web 505 spirally wound around a core 510, the roll 500 having a length (f), a machine direction (MD) and a cross-machine direction (CD) and first and second cross-direction regions 502, 504. Generally the parent roll is further converted to individual rolled tissue products by cutting. The length (t) of the log prior to cutting is from about 80 inches to about 120 inches. In another embodiment, the length of the log to be cut is from about 95 inches to about 105 inches.

Figure 4B:
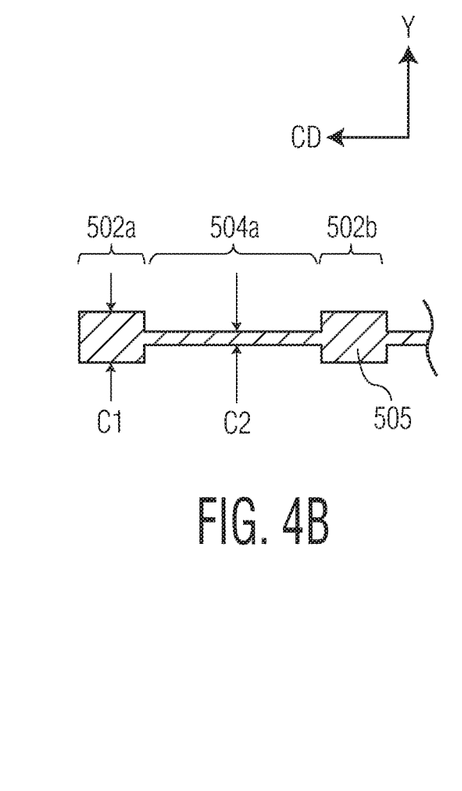
FIG. 4B is a cross-sectional view of a cross-machine direction portion of a tissue through line 4B-4B of FIG. 4A.

The parent roll 500, illustrated in FIG. 4A, has a plurality of first CD regions 502a-502d and second CD regions 504a-504c where the second CD regions 504 are bounded by first CD regions 502. At least one web property selected from the group consisting of sheet bulk, caliper and surface smoothness varies between the first and second CD regions. For example, as illustrated in FIG. 4B, the sheet caliper (C1) in the first CD regions 502a, 502b is greater than the sheet caliper (C2) in the second CD region 504. In certain preferred embodiments a given web property, such as sheet caliper, is substantially similar amongst given regions, i.e., a first CD region, but varies between a first and a second CD region.

Figure 5A:
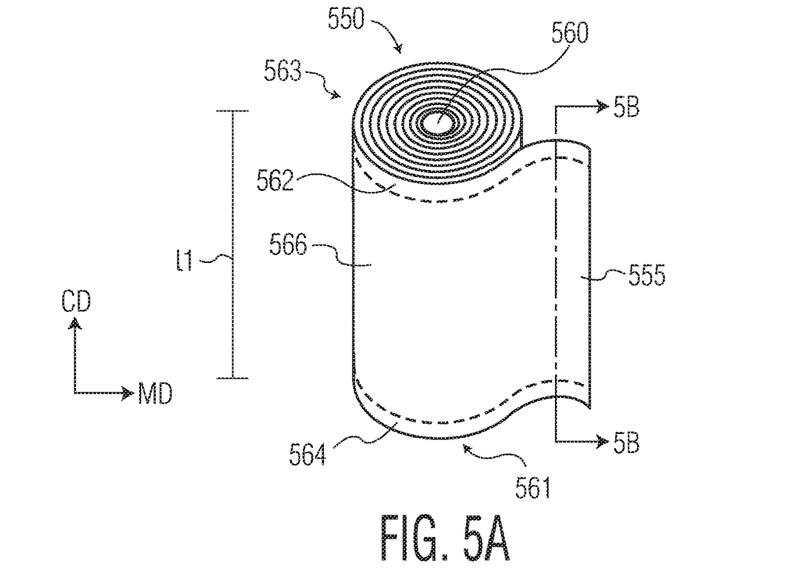
FIG. 5A is a perspective view of a rolled tissue product according to one embodiment of the present invention.
Figure 5B:
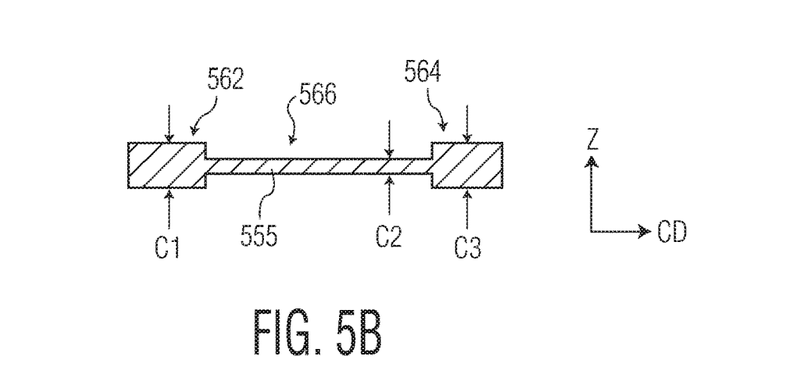
FIG. 5B is a cross-section view of a tissue web prepared according to the present invention through the line 5B-5B of FIG. 5A.

FIGS. 5A and 5B show an exemplary embodiment of a rolled tissue product 550 that has been cut from the parent roll 500 of FIG. 4A having the exemplary repeating first and second CD regions 502, 504. The rolled tissue product 550 comprises a web 555 spirally wound around a core 560, the roll 550 having first and second calendered regions 562, 564 disposed adjacent to the edge 561 on each of the axial surfaces. In one embodiment, the parent roll 500 has been cut such that an edge 561 of the rolled tissue product 550 is tangential to one or more first CD regions 502. The length of the rolled tissue product 550 that a parent roll may be cut into can be any length (l1) that is less than the length (l) of the original parent roll. In one embodiment, the rolls are from about 3 to about 15 inches long. In another embodiment the rolls are from about 4 to about 12 inches long.

The web 555 generally comprises first and second calendered portions 562, 564 spaced apart in the cross-machine (CD) direction and separated from one another by a calendered middle portion 566. The first calendered web portion 562 is adjacent to the first roll end 563 and the second calendered web portion 564 is adjacent to the second roll end 561. The relative length of the first and second calendered portions 562, 564 and the middle calender portion 566 may vary relative to the overall length (l1) of the tissue roll. Generally the length of the middle calendered web portion is greater than the length of the first and second calendered web portions. In a particularly preferred embodiment the length of the middle portion is at least about percent of the overall length (l1) of the tissue roll and more preferably at least about 70 percent, such as from about 50 to about 90 percent and still more preferably from about 70 to about 90.

Generally the first and second calendered web portions have at least one web physical property that is different than the middle portion of the web and therefore the roll generally has first and second ends having at least one physical property that is different than the middle portion. Web properties that may differ between the first and second ends and the middle may include sheet caliper, sheet bulk and surface smoothness. For example, with reference to FIG. 5B the web 555 may comprise first and second calendered portions 562, 564 spaced apart in the cross-machine (CD) direction and separated from one another by a middle calendered portion 566, where the first and second portions 562, 564 have a caliper (C1 and C3 respectively) that is greater than the middle calendered portion 566 caliper (C2). In certain embodiments the caliper (C1, C3) of the first and second portions 562, 564 may be from about 10 to about 50 percent greater than the caliper (C2) of the middle portion 566.

In other embodiments the invention provides a rolled tissue product comprising a calendered tissue web having a machine direction, a cross-machine direction and first, second and third cross-machine direction regions, the web spirally wound into a roll having a first end, a second end and a middle portion disposed there-between, wherein the first and third cross-machine direction regions are adjacent to the first and second ends and wherein the firmness of the first and the second ends is greater than the firmness of the middle portion. In a particularly preferred embodiment the firmness of the first and second ends is substantially equal and is from about 10 to about 50 percent greater than the firmness of the middle portion. For example, the first and second ends may have a firmness from about 4.0 to about 10.0 mm and the middle portion may have a firmness from about 8.0 to about 14.0 mm.

In still other embodiments the invention provides a rolled tissue product comprising a calendered tissue web having a machine direction, a cross-machine direction and first, second and third cross-machine direction regions, the web spirally wound into a roll having a first end, a second end and a middle portion disposed there-between, wherein the first and third cross-machine direction regions are adjacent to the first and second ends and wherein the first and third cross-machine direction regions have substantially equal sheet caliper which is greater than the sheet caliper of the second region. In certain embodiments the first and third regions have a sheet caliper that is from about 10 to about 50 percent greater than the sheet caliper of the second region. For example, in certain embodiments, the first and third regions have a sheet caliper that is substantially similar and ranges from about 800 to about 1,200 μm and the sheet caliper of the second region is from 500 to 800 μm.

In other embodiments the sheet bulk may vary across the cross-machine direction of the web such that when the web is wound into a roll the first and second ends of the roll have a different sheet bulk than the middle portion. For example, the roll may comprise a calendered tissue web having a machine direction, a cross-machine direction and first, second and third cross-machine direction regions, the web spirally wound into a roll having a first end, a second end and a middle portion disposed there-between, wherein the first and third regions have a sheet bulk that is at least about 10 percent greater than the sheet bulk of the second region. In a particularly preferred embodiment the tissue web may have a basis weight from about 10 to about 60 grams per square meter (gsm) and the first and third regions may have a sheet bulk greater than about 12 cc/g, such as from about 12 to about 18 cc/g, and the second region may have a sheet bulk less than about 12 cc/g, such as from about 8.0 to about 12 cc/g. In other embodiments the first and third regions may have substantially similar sheet bulks, such as from about 12 to about 14 cc/g, and the second region may have a sheet bulk that is about 20 percent less, such as from about 8.0 to about 10 cc/g.

In yet other embodiments the surface smoothness of the web may vary across the cross-machine direction of the web such that when the web is wound into a roll the first and second ends of the roll have different surface smoothness than the middle portion. For example, the spirally wound tissue web may have first, second and third regions, where the first and third regions may have a surface smoothness at least about 10 percent greater than the surface smoothness of the second region. In a particularly preferred embodiment the first and third regions may have a surface smoothness less than about 1.00, such as from about 0.80 to about 1.00, and the second region has a surface smoothness greater than about 1.00, such as from about 1.00 to about 1.20.

While the physical properties of the inventive webs and tissue rolls may vary across the cross-machine direction the middle portion of the resulting products generally have attributes that are comparable or better than many commercially available products. For example, the middle portion of a rolled tissue product according to the present invention, may have a firmness of less than about 8.0 mm, such as from about 4.0 to about 8.0 mm and more preferably from about 5.0 to about 7.0 mm. At the foregoing firmness levels the middle portion may have a roll bulk greater than about 12 cc/g, such as from about 12 to about 20 cc/g, more preferably from about 15 to 18 cc/g. Generally the foregoing middle portion measurements are taken at a point in the roll that is equal distance from the first and second ends of the roll. Within the above roll firmness and bulk ranges, rolls made according to the present disclosure do not appear to be overly soft and "mushy" as may be undesirable by some consumers during some applications.

In addition to having the foregoing variable cross-machine direction properties, the tissue products of the present invention generally have a basis weight greater than about 10 gsm, such as from about 10 to about 60 gsm, more preferably from about 15 to about 65 gsm and still more preferably from about 40 to about 60 gsm. At the foregoing basis weights the products are also generally strong enough to withstand use and therefore preferably have a GMT greater than about 1,000 g/3", such as from about 1,000 to about 3,500 g/3", more preferably from about 1,500 to about 2,500 g/3", and still more preferably from about 1,750 to about 2,300 g/3". Accordingly, in certain embodiments, rolled products made according to the present disclosure may comprise a spirally wound single-ply calendered tissue web having a basis weight from about 35 to about 60 gsm and a GMT from about 1,500 to about 3,000 g/3".

In still other embodiments, the present disclosure provides tissue webs having good tensile properties, are flexible and not overly stiff. As such the tissue products generally have a CD Stretch greater than about 8.0 percent, such as from about 8.0 to about 12.0 percent, and more preferably from about 10.0 to about 12.0 percent. In other embodiments the tissue products have a stiffness index less than about 8.0, such as from about 4.0 to about 8.0, more preferably from about 4.5 to about 7.0 and still more preferably from about 5.0 to about 6.0.

Webs useful in preparing spirally wound tissue products according to the present disclosure can vary depending upon the particular application. In general, the webs can be made from any suitable type of fiber. For instance, the base web can be made from pulp fibers, other natural fibers, synthetic fibers, and the like. Suitable cellulosic fibers for use in connection with this invention include secondary (recycled) papermaking fibers and virgin papermaking fibers in all proportions. Such fibers include, without limitation, hardwood and softwood fibers as well as non-wood fibers.

Tissue products of the present disclosure can generally be formed by any of a variety of papermaking processes known in the art. In one embodiment the base web is formed by an uncreped through-air drying process. Uncreped through-air dried tissue processes useful in practicing the instant invention are described, for example, in U.S. Pat. Nos. 5,656,132 and 6,017,417, both of which are hereby incorporated by reference herein in a manner consistent with the present disclosure.

Tissue webs prepared by anyone of the foregoing methods of manufacture are calendered as described above. In accordance with the present disclosure, the base web of the tissue product is subjected to a calendering process in order to slightly reduce sheet caliper, increase smoothness and decrease stiffness, while maintaining sufficient tensile strength. The calendering process compresses the web, effectively breaking some bonds formed between the fibers of the base web. In this manner, calendering may smooth the surface of the sheet and increase the perceived softness of the tissue product. Moreover, calendering provides the web with at least one variable cross-machine direction property.

Test Methods

Surface Smoothness

The surface properties of samples were measured on a KES Surface Tester (Model KE-SE, Kato Tech Co., Ltd., Kyoto, Japan). For each sample the surface smoothness was measured according to the Kawabata Test Procedures with samples tested along MD and CD and on both sides for five repeats with a sample size of 10 cm×10 cm. Care was taken to avoid folding, wrinkling, stressing, or otherwise handling the samples in a way that would deform the sample. Samples were tested using a multi-wire probe of 10 mm×10 mm consisting of 20 piano wires of 0.5 mm in diameter each with a contact force of 25 grams. The test speed was set at 1 mm/s. The sensor was set at "H" and FRIC was set at "DT". The data was acquired using KES-FB System Measurement Program KES-FB System Ver. 7.09 E for Win98/2000/XP by Kato Tech Co., Ltd., Kyoto, Japan. The selection in the program was "KES-SE Friction Measurement".

KES Surface Tester determined the coefficient of friction (MIU) and mean deviation of MIU (MMD), where higher values of MIU indicate more drag on the sample surface and higher values of MMD indicate more variation or less uniformity on the sample surface.

The values MIU and MMD are defined by:

$$MIU(\bar{\mu})=1/X\int_0^x \mu dx$$

$$MMD=1/X\int_0^x |\mu-\bar{\mu}| dx$$

where $\mu$=friction force divided by compression force $\bar{\mu}$=mean value of $\mu$ x=displacement of the probe on the surface of specimen, cm
X=maximum travel used in the calculation, 2 cm The cross-machine (CD) and machine direction (MD) MIU and MMD values were obtained for both the top and bottom surface of each tissue product sample. Each sample was tested five times and the results averaged to arrive at the reported value. For a given surface (top or bottom) the MMD and MIU values are reported as the square root of the product of MIU-CD and MIU-MD or MMD-CD and MMD-MD. The MIU values for the top and bottom surfaces were averaged and reported surface smoothness.

Tensile

Samples for tensile strength testing were prepared by cutting a 3 inch (76.2 mm)×5 inch (127 mm) long strip in either the machine direction (MD) or cross-machine direction (CD) orientation using a JDC Precision Sample Cutter (Thwing-Albert Instrument Company, Philadelphia, Pa., Model No. JDC 3-10, Ser. No. 37333). The instrument used for measuring tensile strengths is an MTS Systems Sintech 11S, Serial No. 6233. The data acquisition software is MTS TestWorks™ for Windows Ver. 4 (MTS Systems Corp., Research Triangle Park, N.C.). The load cell is selected from either a 50 or 100 Newton maximum, depending on the strength of the sample being tested, such that the majority of peak load values fall between 10 and 90 percent of the load cell's full scale value. The gauge length between jaws is 4±0.04 inches. The jaws are operated using pneumatic-action and are rubber coated. The minimum grip face width is 3 inches (76.2 mm), and the approximate height of a jaw is 0.5 inches (12.7 mm). The crosshead speed is 10±0.4 inches/min (254±1 mm/min), and the break sensitivity is set at 65 percent. The sample is placed in the jaws of the instrument, centered both vertically and horizontally. The test is then started and ends when the specimen breaks. The peak load is recorded as either the "MD tensile strength" or the "CD tensile strength" of the specimen depending on the sample being tested. At least five representative specimens are tested for each product, taken "as is," and the arithmetic average of all individual specimen tests is either the MD or CD tensile strength for the product.

EXAMPLES

Base sheets were made using a through-air dried papermaking process commonly referred to as "uncreped through-air dried" (UCTAD) and generally described in U.S. Pat. No. 5,607,551, the contents of which are incorporated herein in a manner consistent with the present invention. Base sheets with a target bone dry basis weight of about 58 grams per square meter (gsm) were produced. The base sheets were then converted and spirally wound into rolled tissue products.

In all cases the base sheets were produced from a furnish comprising northern softwood kraft (NSWK) and *eucalyptus* kraft (EHWK) using a layered headbox fed by three stock chests such that the webs having three layers (two outer layers and a middle layer) were formed. The tissue web was formed on a Voith Fabrics TissueForm V forming fabric, vacuum dewatered to approximately 25 percent consistency and then subjected to rush transfer when transferred to the transfer fabric. The layer splits, by weight of the web, were 27.5 wt % EHWK/45 wt % NSWK/27.5 wt % EHWK. Strength was controlled via the addition of CMC, Kymene and/or by refining the NSWK furnish of the center layer.

The wet tissue web was transferred to a transfer fabric and then transferred to a through-air drying fabric designated as t-1205-2, previously described in U.S. Pat. No. 8,500,955 and commercially available from Voith Fabrics, Appleton, Wis. Transfer to the through-drying fabric was done using vacuum levels of greater than 8 inches of mercury at the transfer. The transfer fabric and through-air drying fabric were operated at different rates of speed subjecting the web to 60 percent rush transfer. Once transferred to the through-air drying fabric the web was dried to approximately 98 percent solids before winding.

Figure 6:
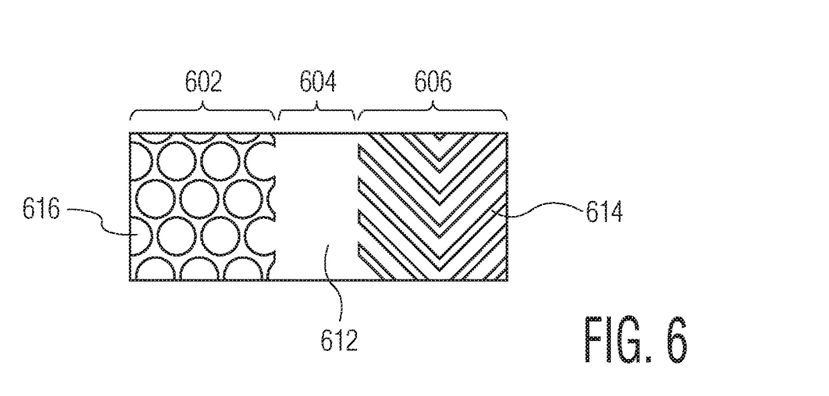
FIG. 6 illustrates patterns applied to a calender roll to produce exemplary webs and products.

The base sheet webs were converted into various rolled towels. Inventive samples were prepared by calendering base sheets using a 15 P&J polyurethane roll on the air side of the sheet and a patterned ebonite roll on the fabric side at a load of either 50 or 200 PLI. An illustration of the calender roll pattern used to produce the present inventive samples is shown in FIG. 6. The pattern roll contained first 602, second 604 and third 606 patterns where each region comprised different shaped male elements—a circle element 616, a rectangular element 612 and a chevron element 614. The heights of the various elements 616, 612, 614 were varied as specified in Tables 1 and 2, below. After calendering the tissue was wound onto a core, which was cut into individual rolled tissue products using a conventional log saw. All rolled products comprised a single-ply tissue web. The first, second and third patterns were not imparted to the web. The web was not embossed.

TABLE 1

| Sample | Calender Load (pli) | Pattern | Male Element Height (mm) | Male Element Surface Area (% of Roll Surface Area) | Caliper (microns) | Firmness (mm) | Sheet Bulk (cc/g) |
|---|---|---|---|---|---|---|---|
| 1 | 50 | Chevron | 0.38 | 75 | 809 | 9.9 | 13.9 |
| 1 | 50 | Uniform | 0.00 | 100 | 682 | 12.5 | 11.8 |
| 1 | 50 | Circles | 0.38 | 75 | 847 | 8.8 | 14.6 |
| 2 | 50 | Chevron | 1.52 | 75 | 983 | 4.5 | 16.9 |
| 2 | 50 | Uniform | 0.00 | 100 | 780 | 8.0 | 13.4 |
| 2 | 50 | Circles | 1.52 | 75 | 984 | 4.6 | 17.0 |

TABLE 2

| Sample | Calender Load (pli) | Pattern | Male Element Height (mm) | Male Element Surface Area (% of Roll Surface Area) | Caliper (microns) | Firmness (mm) | Sheet Bulk (cc/g) |
|---|---|---|---|---|---|---|---|
| 3 | 200 | Chevron | 0.38 | 75 | 719 | 13.6 | 12.4 |
| 3 | 200 | Uniform | 0.00 | 100 | 588 | 16.1 | 10.1 |

TABLE 2-continued

| Sample | Calender Load (pli) | Pattern | Male Element Height (mm) | Male Element Surface Area (% of Roll Surface Area) | Caliper (microns) | Firmness (mm) | Sheet Bulk (cc/g) |
|---|---|---|---|---|---|---|---|
| 3 | 200 | Circles | 0.38 | 75 | 718 | 13.3 | 12.4 |
| 4 | 200 | Chevron | 1.52 | 75 | 942 | 10.2 | 16.2 |
| 4 | 200 | Uniform | 0.00 | 100 | 587 | 16.3 | 10.1 |
| 4 | 200 | Circles | 1.52 | 75 | 973 | 8.9 | 16.8 |

While the invention has been described in detail with respect to the foregoing specification and examples, the following embodiments, as well as equivalents thereof, are within the scope of the invention. Accordingly, in a first embodiment the present invention provides a rolled tissue product comprising a calendered tissue web having a machine direction, a cross-machine direction and first, second and third cross-machine direction regions, the web spirally wound into a roll having a first end, a second end and a middle portion disposed there-between, wherein the first and third cross-machine direction regions are adjacent to the first and second ends and wherein at least one physical property of the web, selected from the group consisting of sheet caliper, sheet bulk and surface smoothness, differs between the first and second cross-machine direction regions.

In a second embodiment the present invention provides the rolled tissue product of the first embodiment wherein the at least one physical web property is sheet caliper and wherein the first region has a sheet caliper that is at least about 10 percent greater than the sheet caliper of the second region.

In a third embodiment the present invention provides the rolled tissue product of the first or the second embodiment wherein the at least one physical web property is sheet caliper and wherein the first region has a sheet caliper from about 800 to about 1,200 μm and the second region has a sheet caliper from about 500 to about 800 μm.

In a fourth embodiment the present invention provides the rolled tissue product of any one of the first through third embodiments wherein the tissue web has a basis weight from about 10 to about 60 grams per square meter (gsm) and wherein the first region has a sheet bulk that is at least about 10 percent greater than the sheet bulk of the second region.

In a fifth embodiment the present invention provides the rolled tissue product of any one of the first through fourth embodiments wherein the first region has a surface smoothness that is from about 10 to about 50 percent greater than the surface smoothness of the second region.

In a sixth embodiment the present invention provides the rolled tissue product of any one of the first through fifth embodiments wherein the first region has a surface smoothness at least about 10 percent greater than the second region, the first region having a surface smoothness from about 0.70 to about 1.00 and the surface smoothness of the second region is from about 1.00 to about 1.25.

In a seventh embodiment the present invention provides the rolled tissue product of any one of the first through sixth embodiments wherein the firmness of the first and second ends is greater than the firmness of the middle portion.

In an eighth embodiment the present invention provides the rolled tissue product of any one of the first through seventh embodiments wherein the firmness of the first and second ends is substantially equal and is from about 10 to about 50 percent greater than the firmness of the middle portion.

In a ninth embodiment the present invention provides the rolled tissue product of any one of the first through eighth embodiments wherein the first and second ends have a firmness from about 4.0 to about 10.0 mm and the middle portion has a firmness from about 8.0 to about 14.0 mm.

In a tenth embodiment the present invention provides the rolled tissue product of any one of the first through ninth embodiments wherein the rolled tissue product does not comprise a visually perceivable pattern or image.

In an eleventh embodiment the present invention provides the rolled tissue product of any one of the first through tenth embodiments wherein the web is not embossed.

In a twelfth embodiment the present invention provides the rolled tissue product of any one of the first through eleventh embodiments wherein the web comprises an unembossed through-air dried tissue web.

In a thirteenth embodiment the present invention provides a rolled tissue product comprising an unembossed, calendered tissue web having a machine direction, a cross-machine direction and first, second and third cross-machine direction regions, the web spirally wound into a roll having a first end, a second end and a middle portion disposed there-between, wherein the first and third cross-machine direction regions are adjacent to the first and second ends and wherein least one physical property of the web selected from the group consisting of sheet caliper, sheet bulk and surface smoothness differs by at least about 5 percent between the first and second cross-machine direction regions.

In a fourteenth embodiment the present invention provides the rolled tissue product of the thirteenth embodiment wherein the at least one physical web property is sheet caliper and wherein the first region has a sheet caliper that is at least about 10 percent greater than the sheet caliper of the second region.

In a fifteenth embodiment the present invention provides the rolled tissue product of the thirteenth or fourteenth embodiment wherein the at least one physical web property is sheet caliper and wherein the first region has a sheet caliper from about 800 to about 1,200 μm and the second region has a sheet caliper from about 500 to about 800 μm.

In a sixteenth embodiment the present invention provides the rolled tissue product of any one of the thirteenth through fifteenth embodiments wherein the tissue web has a basis weight from about 10 to about 60 grams per square meter (gsm) and wherein the first region has a sheet bulk that is at least about 10 percent greater than the sheet bulk of the second region.

In a seventeenth embodiment the present invention provides the rolled tissue product of any one of the thirteenth through sixteenth embodiments wherein the first region has a surface smoothness at least about 10 percent greater than the second region, the first region having a surface smoothness from about 0.70 to about 1.00 and the surface smoothness of the second region is from about 1.00 to about 1.25.

In an eighteenth embodiment the present invention provides the rolled tissue product of any one of the thirteenth through seventeenth embodiments wherein the rolled tissue has a length and the first and third cross-machine direction regions have a length that is at least about 5 percent of the length of the rolled tissue product.

In a nineteenth embodiment the present invention provides the rolled tissue product of any one of the thirteenth through eighteenth embodiments wherein the rolled tissue has a length and the second cross-machine direction regions has a length that is at least about 50 percent of the length of the rolled tissue product.

What is claimed is:

1. A parent roll comprising a calendered tissue web having a width dimension, a length dimension, a machine direction and a cross-machine direction spirally wound around a core, the tissue web having a first cross-machine direction region having a width that is less than the width dimension of the web and a length that is substantially equal to the length of the web, and a second cross-machine direction region having a width that is less than the width dimension of the web and a length that is substantially equal to the length of the web, wherein the first region has at least one physical web property selected from the group consisting of sheet caliper, sheet bulk and surface smoothness that is different from the second region and wherein the at least one physical web property is substantially constant for the entire width and length of a given region.

2. The parent roll of claim 1 wherein the difference in the at least one physical property between the first and second region is at least about 10 percent.

3. The parent roll of claim 1 wherein the first and second regions are immediately adjacent to one another.

4. The parent roll of claim 1 wherein the first and second regions are not visually perceivable.

5. The parent roll of claim 1 wherein the tissue web comprises an unembossed tissue web.

6. The parent roll of claim 1 wherein the tissue web comprises a single-ply unembossed through-air dried tissue web.

7. The parent roll of claim 1 wherein the at least one physical web property is sheet caliper and wherein the first region has a sheet caliper that is at least about 10 percent greater than the sheet caliper of the second region.

8. The parent roll of claim 1 wherein the at least one physical web property is sheet caliper and wherein the first region has a sheet caliper that is from about 10 to about 50 percent greater than the sheet caliper of the second region.

9. The parent roll of claim 1 wherein the at least one physical web property is sheet caliper and wherein the first region has a sheet caliper from about 800 to about 1,200 μm and the second region has a sheet caliper from about 500 to about 800 μm.

10. The parent roll of claim 1 wherein the tissue web has a basis weight from about 10 to about 60 grams per square meter (gsm) and the at least one physical web property is sheet bulk and wherein the first region has a sheet bulk that is at least about 10 percent greater than the sheet bulk of the second region.

11. The parent roll of claim 1 wherein the at least one physical web property is surface smoothness and wherein the first region has a surface smoothness that is from about 10 to about 50 percent greater than the surface smoothness of the second region.

12. The parent roll of claim 1 wherein the at least one physical web property is surface smoothness and wherein the first region has a surface smoothness at least about 10 percent greater than the second region, the first region having a surface smoothness from about 0.70 to about 1.00 and the surface smoothness of the second region is from about 1.00 to about 1.25.

13. A rolled tissue product comprising a calendered tissue web having a width dimension, a length dimension, a machine direction, a cross-machine direction and first, second and third cross-machine direction regions having a width that is less than the width dimension of the web and a length that is substantially equal to the length of the web, the web spirally wound into a roll having a first end, a second end and a middle portion disposed there-between, wherein the first and third cross-machine direction regions are adjacent to the first and second ends and wherein the firmness of the first and the second ends is greater than the firmness of the middle portion.

14. The rolled tissue product of claim 13 wherein the firmness of the first and second ends is substantially equal and is from about 10 to about 50 percent greater than the firmness of the middle portion.

15. The rolled tissue product of claim 14 wherein the first and second ends have a firmness from about 4.0 to about 10.0 mm and the middle portion has a firmness from about 8.0 to about 14.0 mm.

16. The rolled tissue product of claim 13 wherein the first and third cross-machine direction regions have substantially equal sheet caliper and the sheet caliper of the first and third cross-machine direction regions is greater than the sheet caliper of the second region.

17. The rolled tissue product of claim 16 wherein the first and third regions have a sheet caliper that is from about 10 to about 50 percent greater than the sheet caliper of the second region.

18. The rolled tissue product of claim 16 wherein the first and third regions have a sheet caliper from about 800 to about 1,200 μm and the second region has a sheet caliper from about 500 to about 800 μm.

19. The rolled tissue product of claim 13 wherein the tissue web has a basis weight from about 10 to about 60 grams per square meter (gsm) and the first and third regions have a sheet bulk that is at least about 10 percent greater than the sheet bulk of the second region.

20. A patterned cylindrical calender roll having a circumferential direction and an axial direction, the roll comprising a first pattern and a second pattern, the first and second patterns spaced apart in the axial direction and extending continuously about the roll in the circumferential direction, the first pattern comprising a plurality of male elements having a first elevation separated from one another by landing areas having a second elevation wherein the difference between the first and second elevations provides the first pattern with a first pattern height, second pattern comprising a plurality of male elements having a first elevation separated from one another by landing areas having a second elevation wherein the difference between the first and second elevations provides the second pattern with a second pattern height, wherein the first pattern height is greater than the second pattern height.

21. The patterned cylindrical calender roll of claim 20 wherein the first and second patterns are repeated across the axial direction of the roll.

22. The patterned cylindrical calender roll of claim 20 wherein the first pattern comprises discrete male elements that are substantially similar in size and shape and wherein the first pattern height is from about 0.5 to about 1.75 mm.

23. The patterned cylindrical calender roll of claim 20 wherein the first pattern comprises from about 10 to about 20 percent of the outer surface of the patterned roll and the second pattern comprises from about 80 to about 90 percent of the outer surface of the patterned roll.

24. The patterned cylindrical calender roll of claim 20 wherein the first pattern height is from about 100 to about 300 percent greater than the second pattern height.

25. The patterned cylindrical calender roll of claim 20 wherein the first pattern height is greater than about 1.0 mm and the second pattern height is less than about 0.50 mm.

26. A calendering process comprising the steps of:
 a. providing a tissue web comprising pulp fibers;
 b. providing a rotating pattern roll having a circumferential direction and an axial direction in facing opposition to a moving surface creating a nip there-between, the pattern roll comprising a first pattern and a second pattern, the first and second patterns spaced apart in the axial direction and extending continuously about the roll in the circumferential direction, the first pattern comprising a plurality of male elements having a first elevation separated from one another by landing areas having a second elevation wherein the difference between the first and second elevations provides the first pattern with a first pattern height, a second pattern comprising a plurality of male elements having a first elevation separated from one another by landing areas having a second elevation wherein the difference between the first and second elevations provides the second pattern with a second pattern height, wherein the first pattern height is greater than the second pattern height;
 c. conveying the tissue web through the nip; and
 d. contacting the web against the outer surface of the rotating pattern roll and the opposing moving surface.

27. The process of claim 26 further comprising the step of spirally winding the tissue web around a core to form a parent roll and cutting the parent roll to form a plurality of individual rolled tissue products.

28. The process of claim 26 wherein the opposing surface comprises a rotating roll having an exterior surface comprising a polymeric material.

29. The process of claim 26 wherein the first pattern male elements are discrete and comprise from about 10 to about 20 percent of the outer surface area of the pattern roll and wherein the first pattern height is from about 100 to about 300 percent greater than the second pattern height.

30. The process of claim 26 wherein the first pattern male elements form a continuous or a semi-continuous pattern and comprise from about 10 to about 20 percent of the outer surface area of the pattern roll.

31. The process of claim 26 wherein the first pattern male elements are discrete and are substantially similar in size and shape and comprise from about 10 to about 20 percent of the outer surface of the pattern roll and wherein the first pattern height is from about 0.5 to about 1.75 mm.

\* \* \* \* \*